July 22, 1958
P. J. ALLEN
2,844,789
MICROWAVE MAGNETIC DETECTORS
Filed Aug. 19, 1953
3 Sheets-Sheet 2
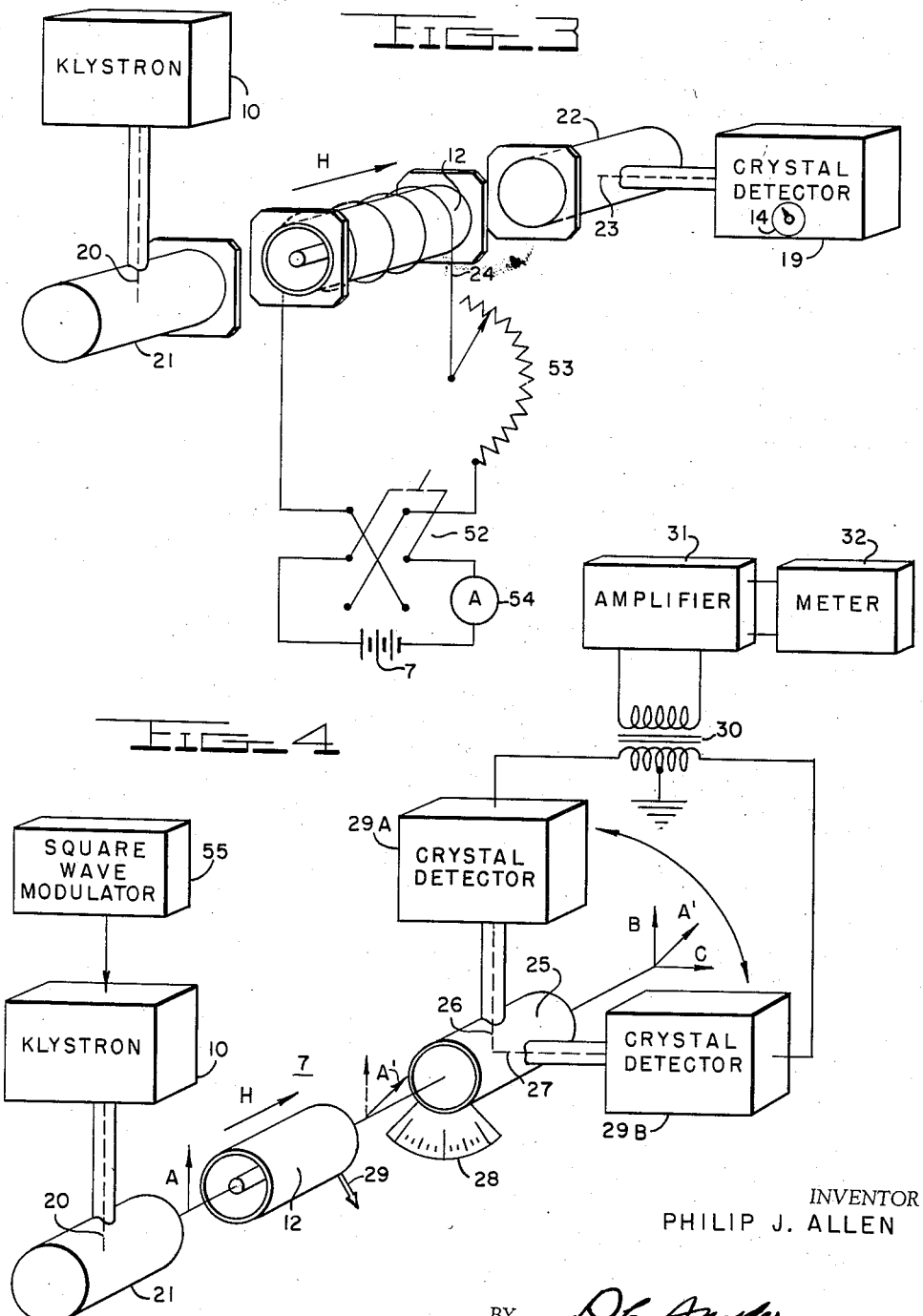
INVENTOR
PHILIP J. ALLEN
BY
ATTORNEYS

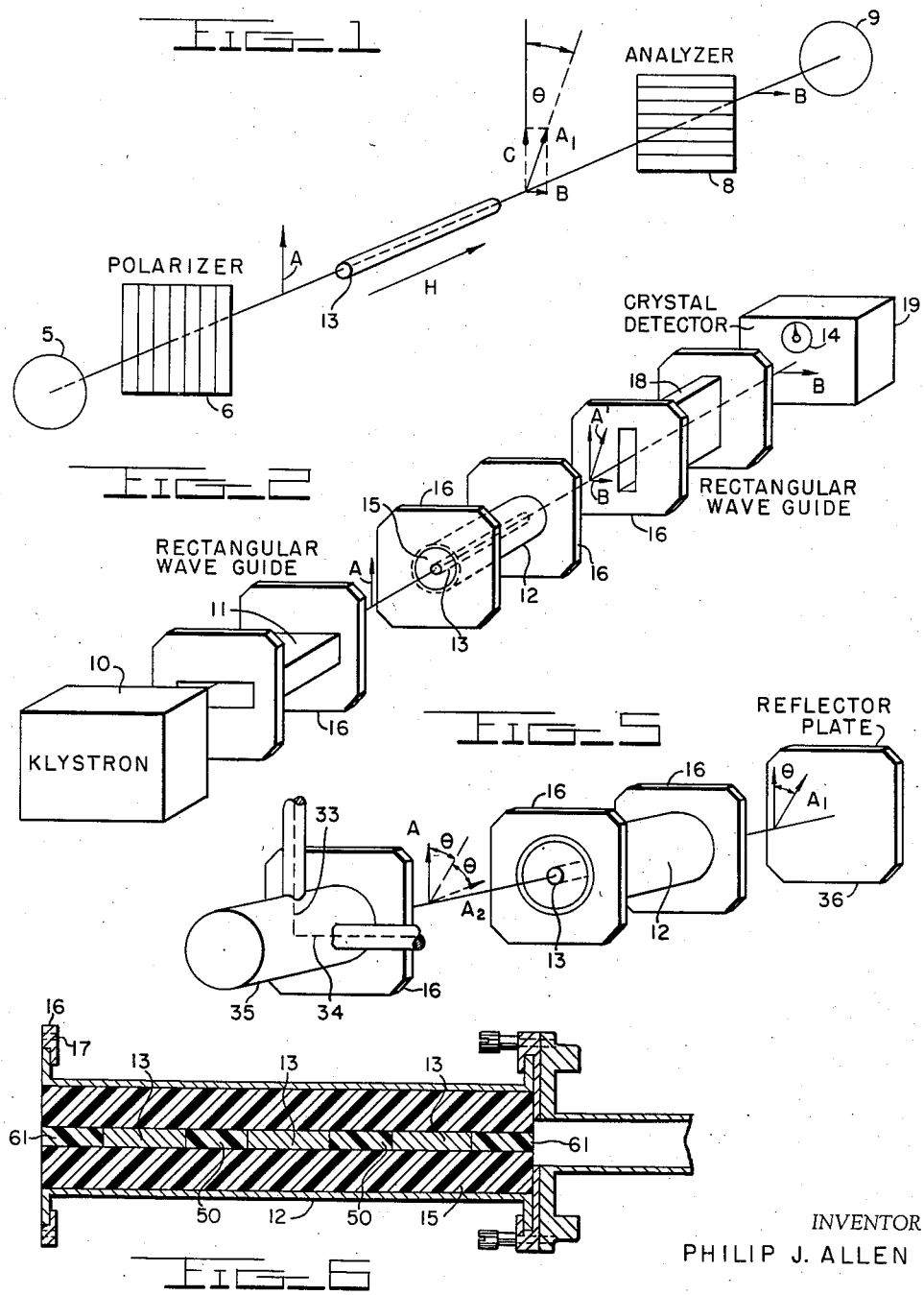

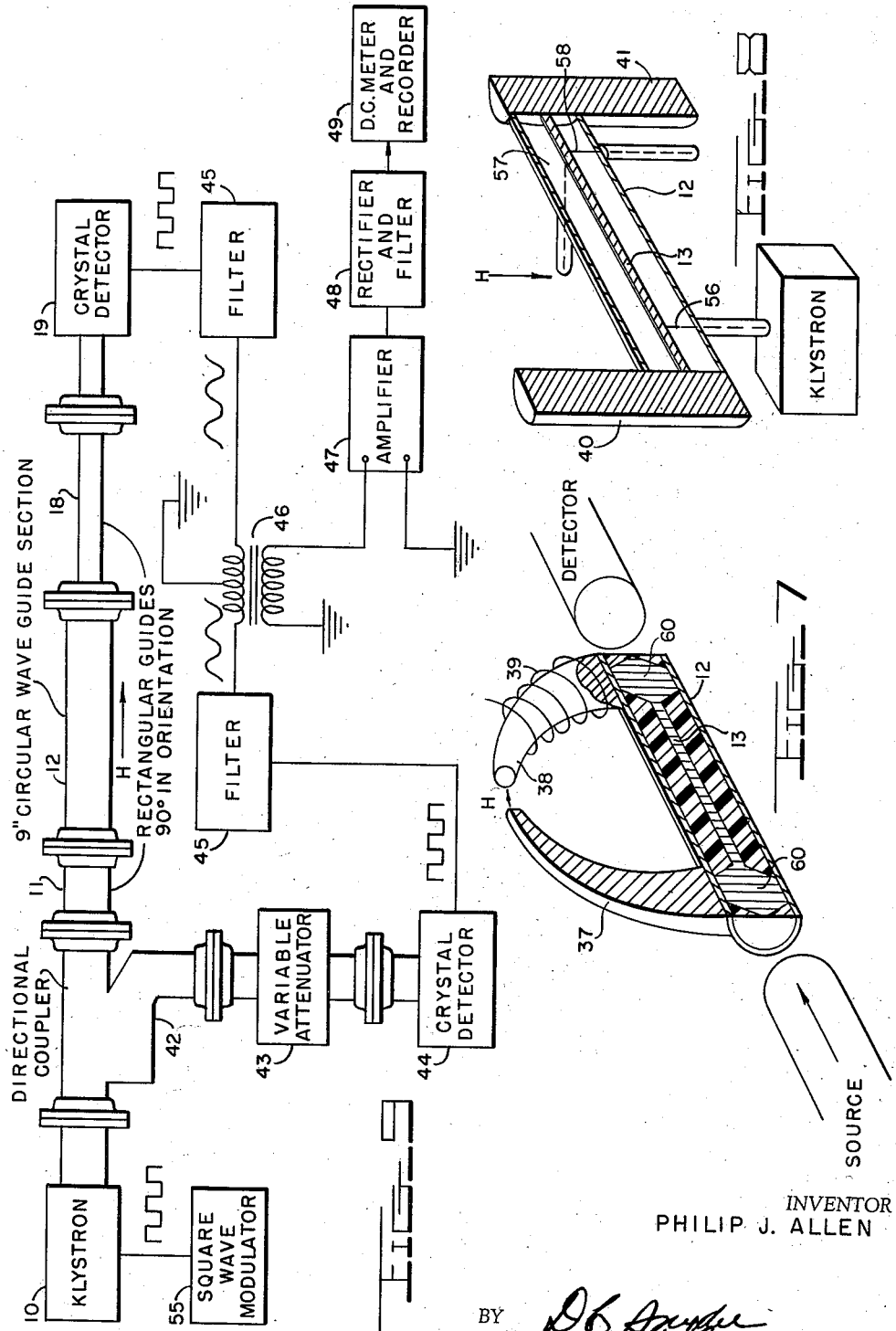

United States Patent Office 2,844,789
Patented July 22, 1958

2,844,789
MICROWAVE MAGNETIC DETECTORS
Philip J. Allen, Forestville, Md.

Application August 19, 1953, Serial No. 375,307

16 Claims. (Cl. 324—43)

(Granted under Title 35, U. S. Code (1952), sec. 266)

This invention relates generally to magnetometers and more specifically to a method and apparatus for measuring the characteristics of extremely small magnetic fields by observing their effect on electromagnetic waves in the presence of ferromagnetic spinels.

Measurement of the direction and intensity of the earth's magnetic field and detection of changes therein has enjoyed increasing importance in recent years through applications in geophysical surveying and in the detection of magnetic objects located underseas, sometimes called magnetic airborne detection. Whether the field's direction, magnitude, or a change in either of these is of interest, it is clear that extreme sensitivity is essential inasmuch as the earth's fields are initially very small and the changes desired to be measured are often less than 1 part in 10,000 of the entire field. The Schmidt magnetometer, the coil inductor, the earth inductor, the saturable core magnetometer, the variable resistance magnetometer and the electron-beam magnetometer are representative of the state of the magnetometer art. Of these prior art devices, the ones approaching adequate sensitivity for magnetic airborne detection are bulky, complex instruments which are both delicate and expensive to construct.

One object of the invention therefore is to provide an improved method and apparatus for measuring magnetic fields.

Another object of this invention is to provide an extremely accurate and sensitive method and apparatus for measuring the strength or change in strength of constant or alternating magnetic fields.

Another object of this invention is to provide a magnetometer system having small size and weight.

Another object of this invention is to provide a magnetometer having high sensitivity and being of very rugged construction.

Another object of this invention is to provide a method and apparatus for measuring small magnetic fields by observing their effect upon electromagnetic waves in the presence of ferromagnetic spinels.

Other objects and advantages of the present invention will become apparent upon a careful consideration of the following detailed description when taken in conjunction with the accompanying drawings, in which:

Figure 1 is a schematic illustrating the principle of operation of the microwave magnetic detector.

Figures 2, 3, 4 and 5 are exploded schematic showings of four embodiments of the invention with vector representation of the polarization of the electric field shown between the separated elements.

Figure 6 is a sectional view of one form of the rotator unit.

Figures 7 and 8 show two arrangements of pole pieces which are placed adjacent the rotator unit.

Figure 9 is a representation of one embodiment of the invention shown schematically as to the circuitry and showing a plan view of the waveguide elements.

In the figures, similar reference characters have been used to designate corresponding elements of the invention.

Referring now to the drawings in detail, in Figure 1 the elements of the invention are schematically shown in their functional arrangement. Source 5 is any source of electromagnetic energy of microwave frequency; it may be a generator of a particular frequency such as aklystron oscillator or be a microwave noise source. The embodiments disclosed have operated at an oscillator frequency of 9300 megacycles. A polarizer 6 receives the random polarized microwave energy and produces plane polarized waves of a selected polarization, for example vertically polarized waves as indicated by vector A.

The plane polarized waves are applied to a ferrite rod 13 which, when coaxially aligned with the magnetic field H to be measured, will impart a rotation to the plane of polarization of the wave. The amount of rotation is proportional to the strength of the field H coaxial with the rod 13 and is indicated by vector A' which has been rotated through an angle $\theta$. The wave is then applied to a second polarizer or analyzer 8 which is oriented at right angles to the polarizer 6 and accepts only that component B of the wave which is perpendicular to its original polarization A. The magnitude of this component is indicated at B and is applied from the analyzer to a detector 9 which, by simply measuring the amplitude of vector B, determines the amount of rotation introduced by the field H and thus the strength of field H. The detector can be calibrated to read in $\theta$ or directly in field strength H.

On reversing the direction of H, vector B is also reversed effecting a 180 degree relative phase change in the R. F. wave reaching the detector 9. It is obvious that by means of a suitaable phase-sensing means, the relative direction as well as magnitude of the field H can be derived.

It should be noted that if the field H were not coaxial with the ferrite rod 13, the rotation imparted by rod 4 will be controlled by the field component which is coaxial. However, this does not represent a limitation of this invention but rather expands its utility. By simply adjusting the position of rod 13 for maximum output at detector 9, the axis or direction of the magnetic field as well as its strength may be determined.

Figs. 2–9 discussed below portray variant embodiments of specific apparatus for producing and detecting the rotation illustrated in Fig. 1. Block 10 in Figure 2 represents a klystron oscillator source which is connected to energize the dominant mode rectangular waveguide 11. Waveguide 11 acts as a polarizer as can be seen from electric field vector A. The polarized wave is applied to the ferrite rod 13, which is a rod of ferromagnetic spinel coaxially mounted in a circular waveguide 12. One preferred method of mounting the ferrite rod 13 is in a cylinder 15 of Teflon which occupies the space between the rod 13 and the wall of the waveguide 12. The rectangular guide 11 may be mounted in direct abutment with the circular guide 12 by means of the flanges 16 as shown. As will be explained below, it is desirable that the flanges be of a rotatable type to permit the best orientation of the adjacent waveguide sections.

In like manner, a rectangular waveguide 18 is secured by flanges 16 to the other end of circular waveguide 12. Waveguide 18, having its long side oriented at 90 degrees to that of waveguide 11, acts as an analyzer discriminating against the vertically polarized component. Thus only the horizontal component B is transmitted by waveguide 18. The output of waveguide 18 is connected to a conventional crystal detector 19 which includes means such as meter 14 for indicating signal magnitude. The output of crystal detector 19 for example as measured by meter 14 is therefore indicative of the magnitude of the magnetic field H.

The waveguide circuit between the klystron 10 and the detector 19 includes a circular section 12 in the vicinity of the ferrite rod to permit rotation of the plane of polarization to be induced without attenuation from the waveguide path.

The circular waveguide section and included ferromagnetic rod may be of any of the standard types such as the Luhrs' mircowave switch from which the coaxial field windings have been removed. However, for obtaining maximum sensitivity, the modified and elongated version described below in connection with Figure 6 is preferred.

There are numerous possible variations in each of the elements of the basic embodiment of the invention shown in Figure 2. In Figure 3, circular waveguides and coaxial lines terminating in probes are substituted for the rectangular waveguides to produce the polarization desired. A pair of circular waveguide sections 21 and 22 are connected to each end of circular section 12. Klystron 10 is connected to a vertically disposed probe 20 in circular section 21 through a coaxial line. Therefore, the circular waveguide 21 is excited in a $TE_{1,1}$ mode polarized vertically. Another probe 23 is horizontally disposed in circular waveguide 22 and connected by coaxial line to the detector 19. Probe 23 discriminates against all but the horizontal component of the polarized wave as does the embodiment of Fig. 1.

A null method of detection is contemplated using the apparatus shown in Figure 3. For this purpose a coil 24 is provided around the circular waveguide 12 for producing a coaxial field opposing that which is being measured. Field current for coil 24 is supplied from a D. C. source such as battery 7 through an ammeter 54, a current reversing switch 52 and rheostat 53. The coil and associated current source may be employed in several ways. First, the amount of field current in coil 24 required to buck out the existing field and produce a null in the detector would be indicative of the field strength H. The direction of the field will be determined by position of reversing switch 52 necessary to obtain a null. The current in coil 24 may be varied by rheostat 53 and measured by ammeter 54 which may be calibrated directly in field strength. Alternately, if it were desired to measure a small change in a relatively large field, the current in coil 24 could be varied to buck out the field as above, then, any small change in field strength would be picked up by crystal detector 19. It will be apparent that the null detection apparatus shown in Fig. 3 could also be used with the rectangular waveguide embodiment shown in Fig. 2.

The embodiment of Figure 4 is shown with circular guides, probes and coaxial lines as in Figure 3 and in addition illustrates another means for null detection. The klystron output is pulsed by its connection to a square wave modulator 55 which in a preferred arrangement serves as its power supply. A preferred modulation frequency is 1000 C. P. S. The pulsing employed in this embodiment provides a 1000 cycle A. C. detector output. Klystron 10 is connected to a vertically disposed probe 20 in circular waveguide 21 through a coaxial line. Waveguide 21 is secured to one end of the ferrite-containing circular waveguide 12. The output end of the ferrite-containing circular guide 12, in operating conditions, is in direct abutment with a circular waveguide 25. Their relative connections are effected by means of rotatable flanges 16 not shown, such as shown in Figures 2, 3, 5 and 6. These flanges permit rotation of waveguide 25 relative to waveguide 12. Scale 28 carried by waveguide 25 and pointer 29 carried by waveguide 12 cooperate to indicate the relative positions of the circular waveguides 12 and 25. Circular waveguide 25 supports a pair of mutually perpendicular probes 26 and 27 mounted in a plane perpendicular to the axis of waxeguide 25 and each connected by coaxial lines to a pair of matching crystal detectors 29a and 29b. The detector outputs are connected to opposite ends of the center tapped primary of a transformer 30, the center tap is connected to ground. The secondary of transformer 30 provides the input to an amplifier 31 with which is associated a meter 32 for indicating the presence of a signal in the amplifier. It will be observed that the connection of detectors 29a and 29b to transformer 30 is such that no signal is applied to amplifier 31 when the outputs from each detector are equal. The mutually perpendicular probes 26 and 27 receive components B and C respectively of vector A' which, when equal, produce a null through crystal detectors 29 and transformer 30, which is indicated on meter 32. By rotation of guide 25 and its associated probes, a position may be found where a null is obtained. After the null is obtained, any change in field will produce an output at transformer 30 which is amplified in 31 and indicated at meter 32. Alternatively, the indication may be obtained by rotating waveguide section 25 each time to obtain a null on meter 32. When this latter procedure is followed, the rotation of vector A is read directly on scale 28. Obviously scale 28 could be calibrated directly in magnetic field strength. This embodiment has the advantage of providing larger signals at each of the detectors, and also provides a matched termination by absorbing all the incident vector A'.

In the interests of making the unit more compact and more adaptable to probing an inaccessible magnetic field, the embodiment of Figure 5 has been evolved. It has been determined experimentally that the amount of rotation of a polarized wave passing through a ferrite subjected to a given magnetic field varies with the length of the ferrite. Thus if the same length of ferrite is employed twice to rotate the same transmitted wave, the sensitivity achieved is approximately the same as for a device with double that length of ferrite. The means for accomplishing this end involves apparatus in which the polarized wave is transmitted in one direction through the ferrite rod, reflected back through the rod in the opposite direction, and the total amount of rotation measured. This method is made possible by the non-reciprocal qualities of ferrite rotation; i. e., the reflected wave is rotated in the same direction as the transmitted wave so that their effect is cumulative producing twice the rotation achieved in one pass through the rod. The exploded view of Figure 5 shows a feed probe 33 and a detector probe 34 located 90° apart in a plane perpendicular to the axis of circular waveguide 35. Waveguide 35 is attached in abutting relationship by means of flanges 16 to another circular waveguide 12 which contains a ferrite rod 13 mounted in a similar manner to that employed in the other embodiments. A reflector plate 36, preferably of any conducting material, is attached to the end of waveguide 12 which is most distant from the probes 33 and 34. The vectors shown between the exploded elements of Figure 6 demonstrate the mode of operation. The vertically polarized field generated by probe 33 is represented by vector A. After the generated wave is passed through ferrite rod 13 subjected to a field H, the plane of polarization is rotated $\theta$ degrees from the vertical; this field polarization is represented by a vector $A_1$. The wave, the polarization of which is represented by vector $A_1$, is reflected by plate 36 back through the ferrite rod 13 which, because of its non-reciprocal properties, rotates the field an additional $\theta$ degrees to the position represented by vector $A_2$ making the total rotation equal to $2\theta$. As in the previous embodiments, the horizontal detector probe 34 discriminates against all but the horizontal component of the field which is used as an indication of the amount of rotation and hence field strength.

It is contemplated that in the embodiments of Figures 2, 3 or 5, any conventional means may be employed to isolate the klystron from the effects of reflected waves due to the poor impedance match.

Sometimes it becomes necessary to measure a magnetic field in an extremely small area. To accomplish this purpose, pole pieces may be closely associated with the ends of the ferrite rod 13 to provide a low reluctance path for magnetic flux from the field to be measured through the rod 13. Thus a field H to be measured may be in a relatively small area while the ferrite rod is of the usual size, i. e., 8" or 9" long. As shown in Figure 7, the pole pieces 37 and 38 are situated extending from the opposite ends of the ferrite rod 13. The ends of the pole pieces remote from the ferrite rod are closely spaced and are intended to be subjected to the small field to be measured. The circular waveguide 12 and the ferrite rod 13 are drawn in section in Figure 7 to show the unusual shape of the ferrite rod which has been designed to reduce the air gap between the pole pieces 37, 38 and the ferrite 13. The enlarged portions 60 of the ferrite element completely fill waveguide 12 and provide intimate association with the pole pieces which are attached externally on the waveguide 12. A coil 39 may be wound on either of the pole pieces to generate a bucking field as was suggested in the embodiment of Figure 3. This arrangement could be easily adapted to a magnetic tape recording head providing at the detector a signal output proportional to the tape magnetization.

In some instances it may be desirable to measure fields perpendicular to or at any angle to the axis of the ferrite rod. This object may be accomplished by constructing moveable pole pieces which will provide a low reluctant path including the ferrite rod. In Figure 8 a pair of pole pieces 40 and 41 are rotatably mounted in abutment with the ends of a ferrite rod 13 with the source and detector being fed and energized respectively within the ferrite containing circular waveguide 12. Thus pole pieces 40 and 41 may be rotated about the axis of the ferrite rod 13 to permit measuring the strength of any field in the plane perpendicular to the axis of the ferrite rod 13. For example, the pole pieces 40 and 41 are oriented vertically as shown for measuring vertical field H. This embodiment with the pole pieces against the opposite ends of the ferrite rod represents another way of reducing the air gap between the pole pieces and the ferrite. Feed probe 56 extending radially into circular waveguide 12 near one end of the ferrite rod 13 may be recessed into the rod or simply extended adjacent to its periphery as is shown. Detector probes 57 and 58, also extending radially into waveguide 12 are oriented at 90° to each other, in a plane perpendicular to the axis of rod 13, and adjacent to the opposite end from feed probe 56. Two detector probes are preferably employed since it reduces the reflections which might result from the abutting pole piece 41. A detector arrangement similar to that of Figure 4, where the detector probes were rotatable to obtain a null, may be used or alternatively the signal from one probe 57 only may be employed and the line from 58 simply terminated in a matched load.

The embodiment shown in Figure 9 is similar to that disclosed in Figure 2 using two orthogonal sections of rectangular waveguides 11 and 18 to accomplish the polarization and analyzation respectively of the rotation of the plane of polarization. In this embodiment, the accuracy is increased by effectively eliminating any possible errors due to fluctuations in the klystron signal. This is accomplished by feeding the pulse klystron signal, produced by a square wave modulator 55 and a klystron 10 as in the embodiment of Figure 4, into a directional coupler 42 the outputs of which feed rectangular waveguide 11, oriented to pass vertically polarized waves, and variable attenuator 43. The plane vertically polarized wave in waveguide 11 is received by circular waveguide 12 which contains a ferrite rod disposed coaxially within the waveguide. The horizontal component of the resultant wave as rotated by the ferrite element in the presence of an axial magnetic field is received by waveguide 18, which is oriented to receive the horizontally polarized component and discriminates against the vertically polarized component. The horizontal component is then applied to a crystal detector 19. The output from the variable attenuator 43 is fed to a similar crystal detector 44. The outputs of crystal detectors 19 and 44 are square waves since that represents the form of the klystron signal modulation. Each detector output is applied to one of a pair of identical bandpass filters 45. The outputs of the filters are of sinusoidal waveform and are supplied in bucking relationship to separate halves of the center-tapped primary of transformer 46. The secondary of transformer 46 is fed to an amplifier 47 which is coupled to an indicating meter recorder 49 through a rectifier and filter 48.

In operation, the variable attenuator is adjusted so that the signal passed by the attenuator to crystal detector 44 is equal to the horizontal component of the rotated wave received by the other detector 19. This equality is obtained by obtaining a null at indicator 49; the null results from the crystal detector outputs being connected in bucking relation in transformer 46. After a null is obtained, any change in the field H will be indicated by meter 49. The resultant instrument is extremely sensitive to changes in the magnetic field acting upon the ferrite rod within waveguide 13.

It has been found that the geometry of the ferrite rotator for optimum sensitivity varies for the particular ferrite material used. Experimental results have also shown that for any particular ferrite the loss per degree of rotation increases with rod length after an optimum point is reached. Inasmuch as the sensitivity varies directly with the loss per degree of rotation and high sensitivity is essential in a device of this type, the sensitivity of the rotator has been increased by using a number of relatively short, spaced ferrite rods as shown in the sectional view of Figure 6. In this manner the optimum length for maximum sensitivity can be used for each spaced rod to thereby increase the overall sensitivity. As shown in Figure 6 three sections of ferrite rod 13 may be used or more if desirable. Each rod is separated by Teflon plugs 50 and supported by Teflon cylinder 15 which is coaxial with the rods and the circular waveguide. It has been found that a reduction in the reflections of wave energy from the end of the ferrite rod is reduced by using plugs 61 which are made of Teflon and are in abutting relation to the end of the ferrite rod 13.

It is clear that there are innumerable means by which the method of this invention may be practiced. The numerous embodiments of apparatus to carry out the invention which have been disclosed are by no means all which have been contemplated. All the basic elements to carry out the method could be replaced by known equivalents in the art while remaining within the scope of the present invention.

It is also to be understood that the disclosed embodiments are merely illustrative of this invention and modifications may, of course, be made without departing from the spirit and scope of the invention as defined in the appended claims.

The invention described herein may be manufactured and used by or for the Government of the United States of America for governmental purposes without the payment of any royalties thereon or therefor.

What is claimed is:

1. The method of measuring properties of a magnetic field comprising the steps of inserting a ferromagnetic spinel element into the field to be measured, propagating a plane polarized electro-magnetic wave through a path including said spinel element, detecting the change in polarization of said wave after passing through said element, and adjusting the orientation of the path of propagation of said wave relative to the direction of the magnetic field to be measured until said change in polarization is maximum.

2. The method of measuring the strength of a magnetic field comprising the steps of probing the field to be measured with a ferromagnetic spinel element, propagating a plane polarized electromagnetic wave through a path including said spinel element, aligning the path of propagation through said element with the field to be measured, receiving said wave after passing through said element, discriminating against the component of said received wave which has a like polarization to said propagated wave, and measuring the amplitude of the remaining component of said received wave.

3. The method of measuring the strength of a magnetic field comprising the steps of probing the field to be measured with a ferromagnetic spinel element, propagating a plane polarized electromagnetic wave through a path including said spinel element, said wave polarization being rotated on passing therethrough, aligning the path of propagation through said element with the field to be measured, comparing the amplitude of perpendicular components of said rotated wave, selecting said perpendicular components so they are equal, and measuring the position of said perpendicular components.

4. Microwave magnetic detection apparatus comprising a source of pulsed high frequency electromagnetic wave energy, means receiving said energy and polarizing it in a particular plane, means adapted to rotate said polarization plane as a function of the magnetic field to which it is subjected, means detecting the component of said rotated wave at a predetermined angle from the first polarization plane, means for detecting another component of said wave, comparing means for comparing the amplitude of said components and means for adjusting the amplitude of at least one of said components to obtain equal amplitudes thereof.

5. Microwave magnetic detection apparatus comprising a source of pulsed high frequency electromagnetic wave energy, means receiving said energy and polarizing it in a particular plane, means adapted to rotate said polarization plane as a function of the magnetic field to which it is subjected, a variable attenuator, a directional coupler connected between said attenuator, said rotating means and said receiving means and adapted to divide the energy transmitted from said receiving means between said rotating means and said attenuator, means connected to said rotating means to produce a detector signal proportional to said rotation, means connected to said attenuator to produce a signal in proportion to the energy transmitted by said attenuator, and means for comparing said rotated signal and said attenuator signal.

6. Microwave magnetic detection apparatus comprising a source of pulsed high frequency electromagnetic wave energy, a first waveguide means energized by said source to propagate a selected plane of polarization, second waveguide means capable of supporting two orthogonal dominant modes of a propagated wave, having an input end and an output end and containing a ferromagnetic spinel element, the input end of said second waveguide means being connected to said first waveguide means and first and second receiver means connected to the output end of said second waveguide means disposed to receive first and second orthogonally disposed components respectively, of an output wave therefrom means for indicating the difference in magnitude of said received components, said first and second receiver means being congruently rotatable about the axis of said second waveguide.

7. Microwave magnetic detection apparatus comprising a source of pulsed high frequency electromagnetic wave energy, a section of circular waveguide, feed probe means extending radially into said waveguide and energized by said source, a ferromagnetic spinel element positioned within said waveguide spaced from said probe, a pair of orthogonally positioned probes extending radially into said waveguide on the other side of said spinel element from the feed probe, said pair of probes being mounted for rotation about the axis of said waveguide, and means connected to said pair of probes to measure the difference between the energies received by each probe of said pair.

8. Microwave magnetic detection apparatus comprising a source of pulsed high frequency electromagnetic wave energy, a section of circular waveguide, feed probe means extending radially into said waveguide and energized by said source, a ferromagnetic spinel element positioned within said waveguide spaced from said probe, a pair of orthogonally positioned probes extending radially into said waveguide on the other side of said spinel element from the feed probe, said pair of probes being mounted for rotation about the axis of said waveguide, indicating means to indicate the relative radial position of said feed probe and said pair of probes, and means connected to said pair of probes to measure the difference between the energies received by each probe of said pair.

9. The method of measuring a change in strength of a magnetic field comprising the steps of probing the field to be measured with a ferromagnetic spinel element, propagating a plane polarized electromagnetic wave through a path including said spinel element, adjusting the orientation of the path of propagation through said element relative to the direction of the magnetic field to be measured until a maximum change in the plane of polarization of said wave is obtained, neutralizing the effect of said magnetic field on said spinel element with an equal counter magnetic field, and detecting subsequent changes in the plane of polarization of said wave after passing through said element.

10. The method of measuring a change in strength of a magnetic field comprising the steps of probing the field to be measured with a ferromagnetic spinel element, propagating a plane polarized electromagnetic wave through a path including said spinel element, detecting orthogonal polarization components of said propagated wave, balancing said detected orthogonal components against each other, and measuring any changes in said detected orthogonal components from said balanced condition.

11. The method of measuring a change in strength of a magnetic field comprising the steps of probing the field to be measured with a ferromagnetic spinel element, propagating a plane polarized electromagnetic wave through a path including said spinel element, detecting orthogonal polarization components of said propagated wave after passing through said element, balancing said orthogonal cmoponents to produce a net output of approximately zero, and measuring subsequent changes in said output from the balanced condition.

12. The method of measuring a change in strength of a magnetic field comprising the steps of probing the field to be measured with a ferromagnetic spinel element, propagating a plane polarized electromagnetic wave through a path including said spinel element, detecting a portion of said plane polarized wave prior to its propagation through said spinel element, receiving said wave after passing through said spinel element, detecting the polarization component of said received wave which is rotated 90° from the original polarization of said propagated wave, adjusting the orientation of the path of propagation through said element relative to the direction of the magnetic field to be measured until a maximum change in the plane of polarization of said wave is obtained, balancing the detected signals to produce a net output signal of approximately zero, and measuring subsequent changes in said output signal from the balanced condition.

13. An apparatus for measuring properties of a magnetic field comprising a source of plane polarized microwave energy; a ferromagnetic spinel element disposed within the magnetic field to be measured; means for propagating a selected plane of polarization of said microwave energy through said spinel element; means for receiving said microwave energy disposed to receive said microwave energy after the traversal of said spinel element; means for determining the plane of polarization of the microwave energy received by said receiving means; and means for adjusting the orientation of the path of said microwave energy from said source to said receiver means with respect to the direction of the magnetic field to be measured.

14. An apparatus for measuring properties of a magnetic field comprising a source of plane polarized microwave energy; a ferromagnetic spinel element disposed within the magnetic field to be measured; means for propagating a selected plane of polarization of said microwave energy through said spinel element; means for receiving said microwave energy disposed to receive said microwave energy after the traversal of said spinel element; means responsive to the difference in plane of polarization of the energy received by said receiving means with respect to said selected plane of polarization; and means for adjusting the orientation of the path of said microwave energy from said source to said receiver means with respect to the direction of the magnetic field to be measured.

15. An apparatus for measuring properties of a magnetic field comprising a source of plane polarized microwave energy; a ferromagnetic spinel element disposed within the magnetic field to be measured; means for propagating a selected plane of polarization of said microwave energy through said spinel element; means for receiving said microwave energy disposed to receive said microwave energy after the traversal of said spinel element; means responsive to the difference in plane of polarization of the energy received by said receiving means with respect to said selected plane of polarization; auxiliary magnetic field producing means for producing a magnetic field of equal magnitude, similar direction and opposite polarity with respect to the magnetic field to be measured; and means for adjusting the orientation of the path of said microwave energy from said source to said receiver means with respect to the direction of the magnetic field to be measured.

16. An apparatus for measuring properties of a magnetic field comprising a source of plane polarized microwave energy; a ferromagnetic spinel element disposed within the magnetic field to be measured; means for propagating a selected plane of polarization of said microwave energy through said spinel element; means for receiving said microwave energy disposed to receive said microwave energy after the traversal of said spinel element; means responsive to the difference in plane of polarization of the energy received by said receiving means with respect to said selected plane of polarization; auxiliary magnetic field producing means for producing a magnetic field of equal magnitude, similar direction and opposite polarity with respect to the magnetic field to be measured; said auxiliary magnetic field producing means being operable in accordance with said difference in polarization responsive means to counterbalance the magnetic field to be measured; and means for adjusting the orientation of the path of said microwave energy from said source to said receiver means with respect to the direction of the magnetic field to be measured.

References Cited in the file of this patent

UNITED STATES PATENTS 2,644,930   Luhrs ------------------ July 7, 1953

OTHER REFERENCES

Bell System Tech. Jour., vol. 31, January 1952, pages 1–31, article by Hogan.